L. M. J. C. LEVAVASSEUR.
VARIABLE TRANSMISSION MECHANISM FOR MOTOR VEHICLES.
APPLICATION FILED DEC. 11, 1906.
952,433.
Patented Mar. 15, 1910.
5 SHEETS—SHEET 1.
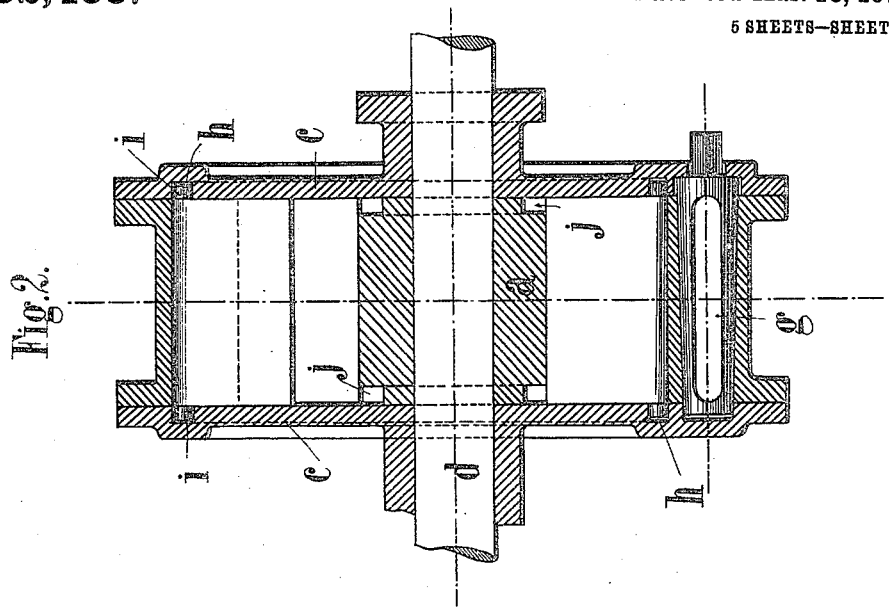
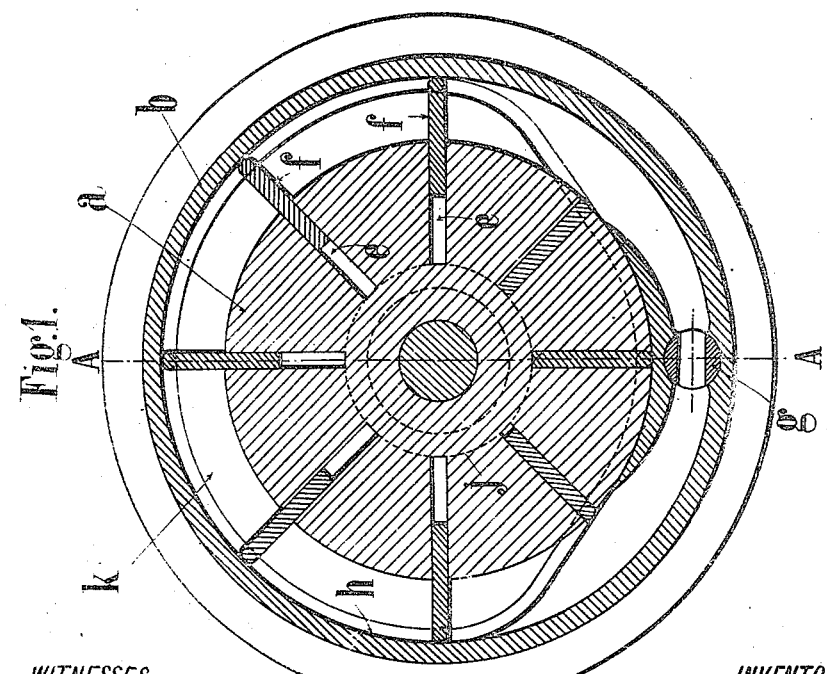
WITNESSES:
W. H. Berrigan.
George G. Schoenlank
INVENTOR
LÉON MARIE JOSEPH CLÉMENT LEVAVASSEUR,
BY
H. van Oldenneel
ATTORNEY.

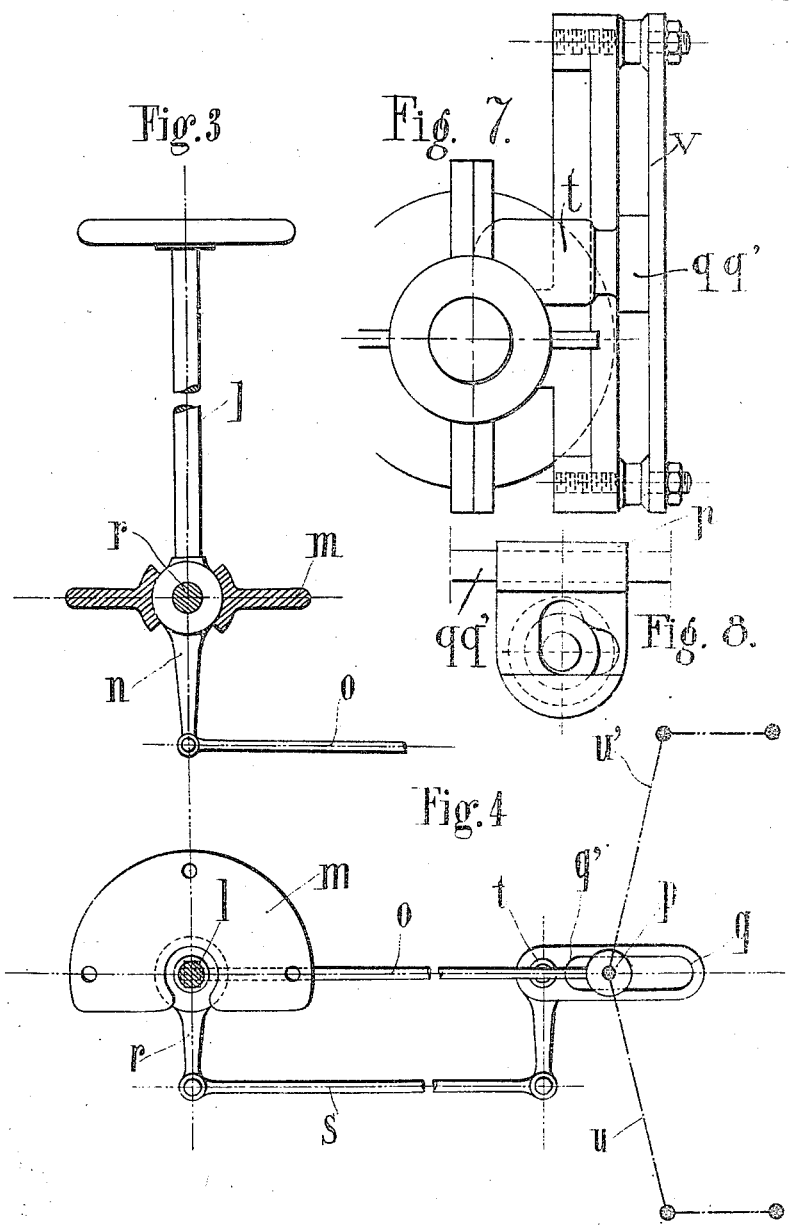

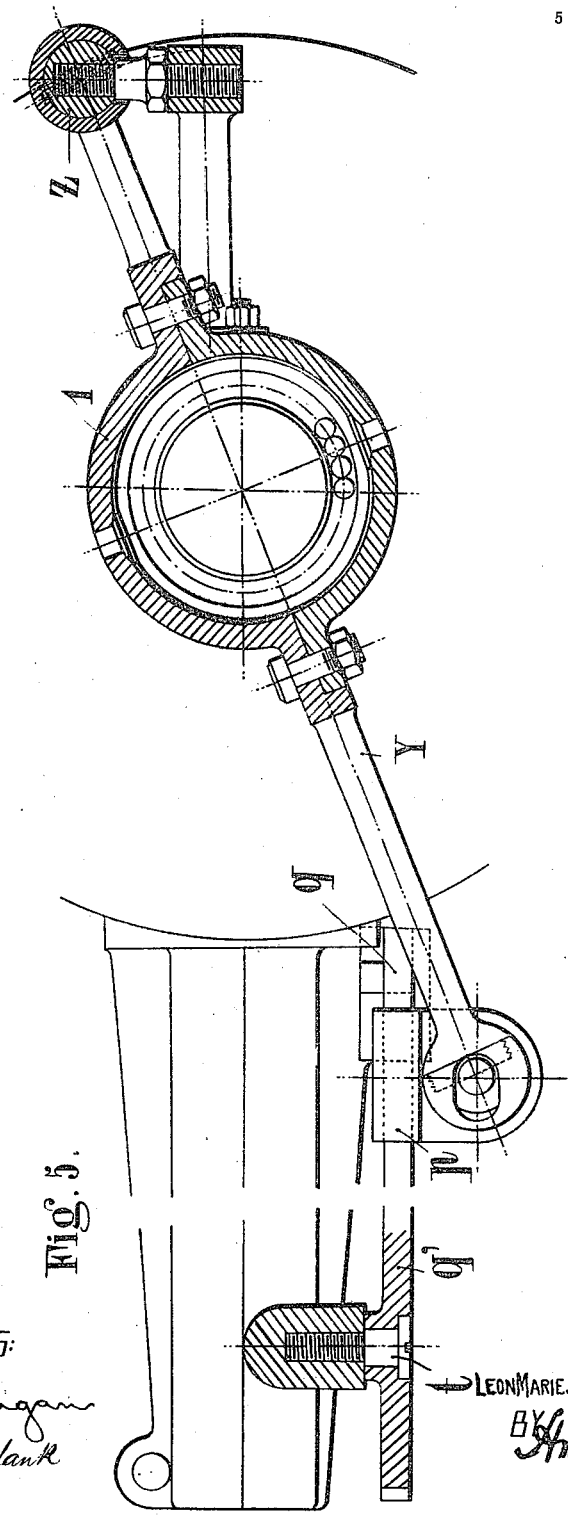

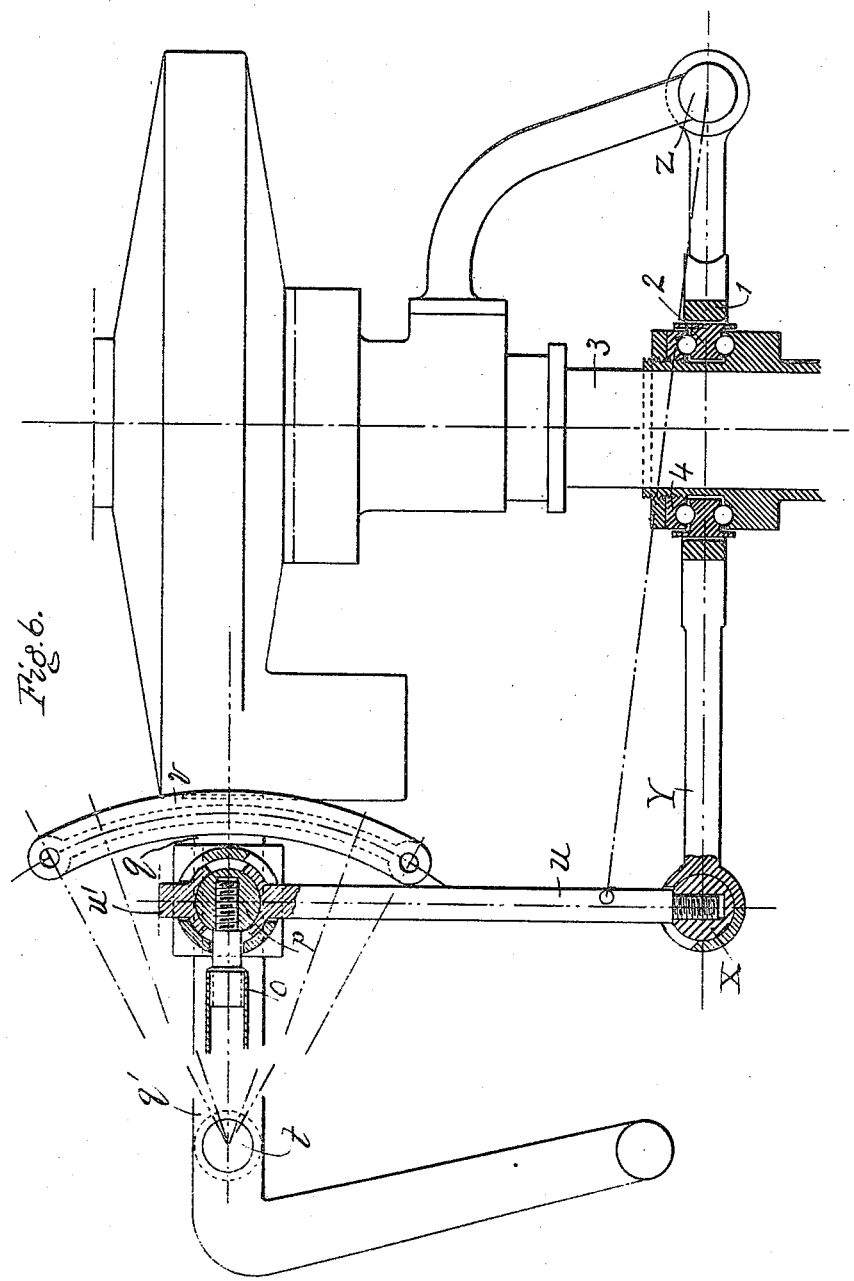

L. M. J. C. LEVAVASSEUR.
VARIABLE TRANSMISSION MECHANISM FOR MOTOR VEHICLES.
APPLICATION FILED DEC. 11, 1906.
952,433.
Patented Mar. 15, 1910.
5 SHEETS—SHEET 5.
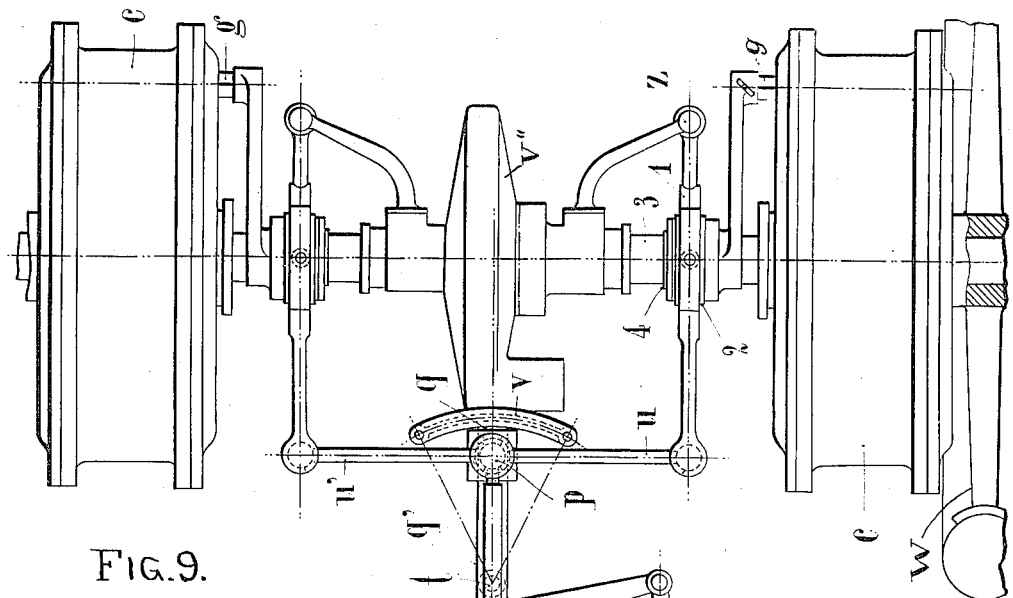
FIG. 9.
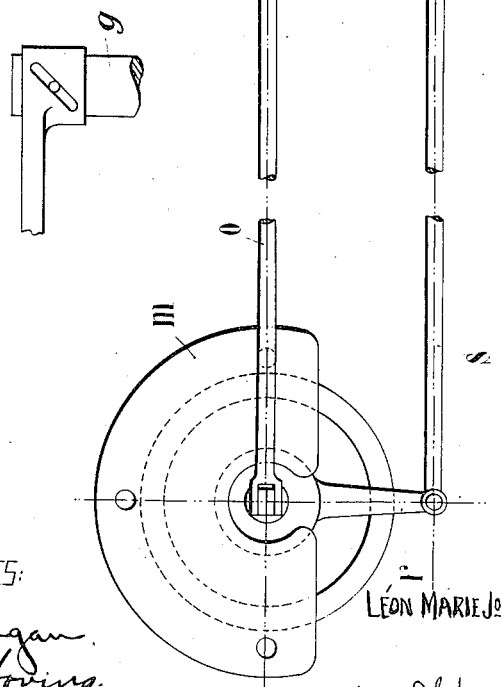
Fig. 10.
Fig. 11.
WITNESSES:
H. H. Berrigan
John N. Hoving
INVENTOR,
LÉON MARIE JOSEPH CLÉMENT LEVAVASSEUR,
BY
van Oldenneel & Schoenlank
ATTORNEYS.

UNITED STATES PATENT OFFICE.

LÉON MARIE JOSEPH CLÉMENT LEVAVASSEUR, OF PUTEAUX, FRANCE, ASSIGNOR TO LA SOCIÉTÉ "ANTOINETTE," OF PUTEAUX, FRANCE.

VARIABLE TRANSMISSION MECHANISM FOR MOTOR-VEHICLES.

952,433. Specification of Letters Patent. Patented Mar. 15, 1910.

Application filed December 11, 1906. Serial No. 347,305.

*To all whom it may concern:*

Be it known that I, LÉON MARIE JOSEPH CLÉMENT LEVAVASSEUR, a citizen of the Republic of France, and resident of Puteaux, France, have invented new and useful Improvements in or Relating to Variable Transmission Mechanism Particularly Applicable to Motor-Vehicles, which improvements are fully set forth in the following specification.

This invention relates to a hydraulic or liquid device for throwing into gear and changing speed, which can also be used as differential gear, and is particularly applicable to motor vehicles.

In order to make the description as clear as possible, a construction of the device according to this invention is illustrated, by way of example, in the accompanying drawings.

Figure 1 is a vertical section through the central plane of the device, Fig. 2 is a vertical transverse section on the line A—A of Fig. 1. Figs. 3 to 8 relate to means for operating the device when applied to motor vehicles, to enable the wheels to be thrown into and out of gear, and the driving of the apparatus acting as differential mechanism, to be varied. Figs. 3 and 4 are diagrammatic views in elevation and in plan. Fig. 5 is an elevation showing a practical construction of the operating system. Fig. 6 is a plan of the same device. Figs. 7 and 8 are detail views, and Fig. 9 shows the device applied to the running gear of a vehicle. Fig. 10 is a plan view showing means for operating valve $g$, and Fig. 11 is a side view of the same.

The variable transmission gear shown in Figs. 1 and 2, comprises a cylindrical core $a$ arranged in the interior of an also cylindrical casing $b$ of larger diameter, the said casing being laterally closed by disks $c$ through which passes the driving shaft $d$ to which the body $a$ is keyed. In the core $a$ are radial slots $e$ of any suitable number, in which can slide, with a small amount of friction, blades $f$ of a width equal to the distance between the disks $c$. Between the core $a$ and the casing $b$ is arranged a perforated plug or "gate" $g$ by means of which all communication between the two parts of the annular space existing on each side of the said tap between the core and the casing, can be interrupted. The central core is capable of turning, as will be readily understood, in the casing $b$, and the blades $f$ are guided by means of cam grooves $h$ in each of the disks $c$, engaging studs or cylindrical parts $i$ secured to the blades and moving in the grooves $h$ during the rotation of the core $a$. The shape of the grooves $h$ is such that the blades extend across the annular space during about half a rotation of the core in the casing, and then gradually withdraw into the slots $e$ and return in order to pass by plug $g$. The central core $a$ is keyed to the driving shaft as already stated, and the casing $b$ is secured to the driven shaft, this being stated, however, merely by way of example, for the casing could be connected to the driving shaft, and the core keyed to the driven shaft.

If any, preferably a non-freezing, liquid, is introduced into the casing, so as to fill the volume available, and if the slots $e$ in the core are connected by circular grooves made on the lateral faces of the core at the bottom of the said slots, it will be understood that, by causing the said core to rotate by means of the driving shaft, the blades as they move in the annular space $k$, will drive the liquid in front of them. A current of liquid is thus produced which, finding a passage through the orifice of the gate $g$, which is open, travels through the apparatus at the same speed as that with which the central core rotates in the casing, which thus remains standing still. The throwing out of gear corresponds, therefore, to the total opening of the gate $g$. On the contrary, by gradually closing the gate $g$, the driven shaft will be rotated by the driving shaft at a speed gradually increasing until the maximum speed which is that of the engine and which corresponds to the total closing of the tap or gate is reached. The variation in the speed of the driven shaft is explained by the gradually rising pressure which is exercised on the casing by the liquid, the circulation of which is retarded or entirely prevented.

The slots $e$ in the core and the grooves $j$ which establish communication between the said slots, are filled with a liquid which passes through one slot into another, by means of the grooves $j$ for the purpose of avoiding any obstacle to the movement of the blades $f$ as they move or withdraw into the slots.

Among the numerous applications for which this device is suitable, may be mentioned the application to motor vehicles in which it can also play the part of a differential mechanism. In that case, each of the wheels is provided (as shown in Fig. 9) with an apparatus identical to that just described, the casing of which is secured to the wheel V V, and the core to the engine.

A device for operating the gates enables first to throw the wheels into gear and out of gear, then to vary the opening of the gates of the apparatus acting as differentials. Such device is diagrammatically shown in Figs. 3 and 4 of the accompanying drawing. The pin and slot arrangement shown in Fig. 10 causes the valve $g$ to rotate when the arms of the shifting collars, attached to the driving gear case $V''$, are operated.

The spindle $l$ of the steering wheel is mounted by means of a ball joint on a part $m$, so that it is able to oscillate forward and backward and also to rotate about its own axis. The spindle $l$ is provided with a bottom extension $n$ connected by a rod $o$ to a part $p$ moving in a link $q \, q'$. The spindle $l$ is moreover, provided with a horizontal arm $r$ connected by a hinged or pivoted rod $s$ to the link $q$. The link $q \, q'$ being pivoted at $t$, it is thus possible to vary its position and to move the part $p$ either to the left or to the right from the pivot point.

Supposing now that the gate of each of the apparatus is connected by a rod $u$ or $u'$ to the part $p$, it will be understood that, by inclining the steering wheel either backward or forward, it is possible either to throw into gear or out of gear the two apparatus at the same time, by moving, by means of the rod $o$, the parts $p$ in the link $q \, q'$ which remains parallel to the axis of the vehicle. When the part is at the point $q$, the taps are both closed, and the wheels secured to the casings which are driven by the cores secured to the engine, are in gear. At the point $q'$ the two taps are fully open, and the engine is thrown out of gear. The movement of the steering wheel described corresponds to traveling in a straight line. In order to turn, the steering wheel is operated in the usual manner, and the movement of the arm $r$ due to the said movement, brings about the oscillation of the link $q \, q'$ about its pivot point $t$. The part $p$ moves and, according to the direction of turning of the steering wheel opens, in proportion to the radius of the curve to be described by the vehicle, the tap of the apparatus of the inner wheel relatively to the curve, and closes that of the apparatus of the outer wheel. The reverse movement of the steering wheel brings the link $q \, q'$ into the direction parallel to the axis of the vehicle which corresponds to the two wheels being equally in gear. It must be pointed out that when the part $p$ is at the point $q'$, corresponding to the engine being disengaged, the steering no longer produces any effect.

In practice, the part $p$ which moves in the link $q \, q'$ is provided, as shown in detail in Figs. 5, 6 and 8, with a ball joint enabling the rods $u \, u'$ (Fig. 6) to execute any movement due either to the oscillating movement forward or backward of the steering wheel, or to the rotation of the said wheel. The free end of the link is guided and supported by a sector or quadrant $v$, (Figs. 6 and 7) which also limits its movements. The ends of the rods $u \, u'$ are also connected by ball joints $x$ to the rod $y$ pivoted at a fixed point $z$. This rod $y$ is provided with a collar 1 pivoted on a ring 2 in which can rotate, in the same way as the shaft 3, a sleeve 4, capable of longitudinally sliding on the said spindle.

It is obvious that the same arrangement being made for each of the rods $u \, u'$, and the sleeves 4 acting directly on the taps of the apparatus, it will be possible to obtain, whatever be the given position of the part $p$, a movement of the sleeves bringing about the opening or the closing of the taps in the conditions hereinbefore described.

Claims.

1. In a motor-propelled vehicle, a device for throwing into and out of gear and for changing speed, a driving shaft, a driven shaft for propelling the vehicle, a casing having a guide in a side wall thereof and secured to one of said shafts, a core within the casing and secured to the other shaft, said core having radial slots, blades movably fitting said slots and having parts engaging the guide aforesaid of the casing, a gate within the casing and between it and the core, a steering device for the vehicle, and connections from said steering device for opening and closing the gate to the extent desired.

2. In a motor-propelled vehicle, a device for throwing into and out of gear and for changing speed, a driving shaft, a driven shaft for propelling the vehicle, a casing having a guide in the side wall thereof and secured to one of said shafts, a core within the casing and secured to the other shaft, said core having radial slots, blades movably fitting said slots and having parts engaging the guide aforesaid of the casing, a gate within the casing and between it and the core, a steering device for the vehicle including a steering shaft mounted by a ball-joint, and connections, including two rods each connected with the steering shaft and levers operated by said rods, for opening and closing the aforesaid gate to the extent desired.

In testimony whereof I have signed this specification in the presence of two subscribing witnesses.

LÉON MARIE JOSEPH
CLÉMENT LEVAVASSEUR.

Witnesses:
EMILE LEDRET,
H. C. COXE.